United States Patent
Kameoka et al.

(10) Patent No.: US 9,694,660 B2
(45) Date of Patent: Jul. 4, 2017

(54) GLASS RUN

(71) Applicant: NISHIKAWA RUBBER CO., LTD., Hiroshima-shi, Hiroshima-ken (JP)

(72) Inventors: Taisuke Kameoka, Hatsukaichi (JP); Shinichiro Emori, Hatsukaichi (JP)

(73) Assignee: NISHIKAWA RUBBER CO., LTD., Hiroshima-Shi (JP)

( * ) Notice: Subject to any disclaimer, the term of this patent is extended or adjusted under 35 U.S.C. 154(b) by 0 days.

(21) Appl. No.: 15/155,689

(22) Filed: May 16, 2016

(65) Prior Publication Data

US 2016/0355075 A1    Dec. 8, 2016

(30) Foreign Application Priority Data

Jun. 3, 2015   (JP) ................... 2015-113540
Feb. 24, 2016  (JP) ................... 2016-032971

(51) Int. Cl.
*B60J 5/04*    (2006.01)
*B60J 10/74*   (2016.01)
*B60J 10/32*   (2016.01)
*B60J 10/50*   (2016.01)

(52) U.S. Cl.
CPC ............... *B60J 10/74* (2016.02); *B60J 10/32* (2016.02); *B60J 10/50* (2016.02)

(58) Field of Classification Search
CPC ... B60J 10/76; B60J 10/21; B60J 10/74; B60J 10/88; B60J 10/265; B60J 10/79; B60J 10/30; B60J 10/32; B60J 10/84; B60J 5/0402
USPC ................... 49/440, 441, 484.1, 489.1, 490.1
See application file for complete search history.

(56) References Cited

U.S. PATENT DOCUMENTS

| | | | | |
|---|---|---|---|---|
| 4,951,418 A * | 8/1990 | Keys | ........................ | B60J 10/24 49/440 |
| 6,240,677 B1 * | 6/2001 | Baumann | ................. | B60J 10/79 49/479.1 |
| 6,370,824 B1 * | 4/2002 | Keeney | .................... | B60J 10/79 49/441 |
| 6,996,936 B1 * | 2/2006 | Maass | ...................... | B60J 10/74 49/440 |
| 7,487,615 B2 * | 2/2009 | Watanabe | ................ | B60J 10/74 49/428 |

(Continued)

FOREIGN PATENT DOCUMENTS

| | | |
|---|---|---|
| JP | 2008-518135 A | 5/2008 |
| JP | 2014-159193 A | 9/2014 |
| WO | WO-2006/046133 A1 | 5/2006 |

*Primary Examiner* — Justin Rephann
(74) *Attorney, Agent, or Firm* — Robert P. Michal, Esq.; Carter, DeLuca, Farrell & Schmidt, LLP

(57) ABSTRACT

A glass run for guiding a door glass in a frame includes: a body having a substantially U-shaped cross-section including an outer-cabin side wall, an inner-cabin side wall longer than the outer-cabin side wall in cross section and a connecting wall which connects the side walls; an outer lip and an inner lip which are slidably brought into contact with the door glass; and a holding lip which extends from an end part of the inner-cabin side wall for fastening an inner-cabin side part of the frame together with the inner-cabin side wall. A noise insulation wall protrudes at least on the end part of the inner-cabin side wall for closing a concave space between an inner-cabin side surface of the door glass and the inner-cabin side wall.

7 Claims, 15 Drawing Sheets

(56) References Cited

U.S. PATENT DOCUMENTS

| | | | | |
|---|---|---|---|---|
| 7,650,718 B2* | 1/2010 | Eguchi | B60J 1/08 | |
| | | | 49/440 | |
| 8,051,606 B2* | 11/2011 | Maaβ | B60J 10/74 | |
| | | | 49/479.1 | |
| 8,819,997 B2* | 9/2014 | Bouvatier | B60R 13/04 | |
| | | | 49/440 | |
| 8,869,456 B2* | 10/2014 | Matsuura | E06B 7/22 | |
| | | | 49/489.1 | |
| 8,950,121 B2* | 2/2015 | Inaba | B60J 10/88 | |
| | | | 296/146.9 | |
| 2001/0001917 A1* | 5/2001 | Goto | B60J 10/79 | |
| | | | 49/440 | |
| 2002/0139054 A1* | 10/2002 | Schlachter | B60J 10/88 | |
| | | | 49/479.1 | |
| 2005/0072053 A1* | 4/2005 | Filipczak | B60J 10/79 | |
| | | | 49/490.1 | |
| 2005/0198906 A1* | 9/2005 | Fujita | B60J 10/76 | |
| | | | 49/428 | |
| 2007/0251152 A1* | 11/2007 | Takase | B60J 10/74 | |
| | | | 49/441 | |
| 2009/0071077 A1* | 3/2009 | Takase | B60J 10/277 | |
| | | | 49/489.1 | |
| 2009/0108625 A1* | 4/2009 | Minami | B60J 10/277 | |
| | | | 296/146.2 | |
| 2010/0077670 A1* | 4/2010 | Jimenez | B60J 10/88 | |
| | | | 49/479.1 | |
| 2011/0204671 A1* | 8/2011 | Baratin | B60J 10/0051 | |
| | | | 296/93 | |
| 2012/0060422 A1* | 3/2012 | Roll | B60J 10/84 | |
| | | | 49/441 | |
| 2012/0079772 A1* | 4/2012 | Mine | B60J 10/76 | |
| | | | 49/490.1 | |
| 2012/0091746 A1* | 4/2012 | Zimmer | B60J 10/0031 | |
| | | | 296/93 | |
| 2013/0111821 A1* | 5/2013 | Suzuki | B60J 10/78 | |
| | | | 49/483.1 | |
| 2013/0305612 A1* | 11/2013 | Murree | E06B 7/2314 | |
| | | | 49/483.1 | |
| 2014/0020302 A1* | 1/2014 | Alba | B60J 10/04 | |
| | | | 49/495.1 | |
| 2014/0033614 A1* | 2/2014 | Bartolomucci | B60J 10/088 | |
| | | | 49/506 | |
| 2015/0130214 A1* | 5/2015 | Im | B60J 5/0402 | |
| | | | 296/146.2 | |

* cited by examiner

GLASS RUN

CROSS REFERENCE TO RELATED APPLICATION

This application claims the benefit under 35 USC §119 of JP Patent Applications JP 2015-113540 filed Jun. 3, 2015 and JP2016-032971 filed Feb. 24, 2016, the entire disclosure of which is incorporated herein by reference.

BACKGROUND INFORMATION

The present invention relates to a glass run which is fittable along a door sash (frame) of an automobile door for guiding the door glass lifting or lowering.

As shown in FIG. 11, an ordinary glass run 20 has been fit on a door sash (frame) 400 of a front door 200 and a rear door 300 of an automobile for guiding a door glass 9 lifting or lowering.

FIG. 12 shows the glass run 20 operatively coupled on a side of the front door 200. The glass run 20 includes: a front side vertical edge part 11 and a rear side vertical edge part 12, which extend upward from an inner part of a door panel 200a of the front door 200; and a cross edge part 13 which connects upper ends of the two vertical edge parts 11, 12. The two vertical edge parts 11, 12 and the cross edge part 13 are generally formed by extrusion molding and connected with each other via two molded parts 14, 15.

The glass run 20 shown in FIG. 13 has been well known, which is applied on the rear side vertical edge part 12.

The glass run 20 is fit on the door sash 400 of the automobile door 200. The door sash 400 has a substantially U-shaped cross-section of which inner-cabin side is longer than an outer-cabin side. The door sash 400 includes: an outer-cabin side part 401; an inner-cabin side part 402 which is longer than the outer-cabin side part 401 in cross section; and a connecting part 403 which connects the side parts 401 and 402. The inner-cabin side part 402 has a protrusion 402a protruding toward the outer-cabin side.

The glass run 20 includes: a body 21 having a substantially U-shaped cross-section including an outer-cabin side wall 23, an inner-cabin side wall 22 which is longer than the outer-cabin side wall 23 in cross section and a connecting wall 24 which connects the side walls and forms a channel 27; an outer lip 26 which extends toward an inner-cabin side from an inner-cabin side surface of the outer-cabin side wall 23 and is slidably brought into contact with a door glass 9; an inner lip 25 which extends toward an outer-cabin side from a position on an outer-cabin side surface of the inner-cabin side wall 22 and is slidably brought into contact with the door glass 9, the position being at a distance 40 toward a side of the connecting wall 24 from an end part 22a of the inner-cabin side wall 22; and a large holding lip 28 which extends from the end part 22a of the inner-cabin side wall 22 for fastening the inner-cabin side part 402 of the door sash 400 together with the inner-cabin side wall 22 and elastically engages an inner-cabin side surface of the inner-cabin side part 402 of the door sash 400.

The inner-cabin side wall 22 has lips 29a, 29b formed respectively on an inner-cabin side and an outer-cabin side thereof. The lip 29a extending toward the inner-cabin side from the inner-cabin side wall 22 is anchored by the protrusion 402a formed on the inner-cabin side part 402 of the door sash 400. The lip 29b extending toward the outer-cabin side from the inner-cabin side wall 22 abuts the an inner-cabin side of the inner lip 25 which bends toward the inner-cabin side wall 22 side when slidably brought into contact with the door glass 9, thereby supporting the inner lip 25. Also, the inner-cabin side and the outer-cabin side of the inner-cabin side wall 22, the inner-cabin side and the outer-cabin side of the outer-cabin side wall 23 and the outer-cabin side of the lip 29b have convexes and concaves 29d, 29e, 29f, 29g and 29h formed thereon for non-slippage.

The inner lip 25 extends toward the side of the connecting wall 24 from the outer-cabin side surface of the inner-cabin side wall 22. The outer lip 26 extends toward the inner-cabin side from the inner-cabin side surface of the outer-cabin side wall 23 and is forked into an inner-attaching lip 26X and an outer-attaching lip 26Y. The inner-attaching lip 26X extends toward the side of the connecting wall 24 from an inner surface of an end part 23a of the outer-cabin side wall 23, faces the inner lip 25, and fastens the door glass 9 together with the inner lip 25. The outer-attaching lip 26Y is substantially perpendicular to the inner-attaching lip 26X.

The glass runs with the inner-cabin side walls which are longer than the outer-cabin side walls in cross section are disclosed, for example, in Japanese unexamined Patent Publications No. 2008-518135 and No. 2014-59193.

Unfortunately, however, according to a structure shown in FIG. 13 that the inner-cabin side wall 22 is longer than the outer-cabin side wall 23 and a base root of the inner lip 25 is at the distance from the end part 22a of the inner-cabin side wall 22, closing the door glass 9 forms a large space 51 among the door glass 9, the end part 22a of the inner-cabin side wall 22 and the base root of the inner lip 25. The structure hampers quietness.

More specifically, as sound penetrates the door glass 9 (in FIG. 13, a solid line is penetrated sound) and enters the space 51, the sound echoes between the inner-cabin side wall 22 and the door glass 9 (in FIG. 13, a dotted line is an echo), thereby amplifying sound pressure level. As a result, the sound is higher in the sound pressure level when emitted inside the automobile (in FIG. 13, one dotted chain line is emitted sound) than before entering the space 51.

FIG. 13 shows the glass run 20 applied on the rear side vertical edge part 12 formed by extrusion molding. In the same manner, in case of a glass run 20 applied on a corner shown in FIG. 14, which is formed by die molding, closing the door glass 9 forms a large space 52 among the door glass 9, the end part 22a of the inner-cabin side wall 22 and the base root of the inner lip 25. The structure also hampers quietness.

FIG. 13 shows the glass run 20 applied on the rear side vertical edge part 12 formed by extrusion molding. In the same manner, when the glass run 20 is applied on the cross edge part 13 formed by extrusion molding, the glass run 20 has the same problem of quietness.

Japanese unexamined Patent Publication No. 2008-518135 discloses to dispose a lip of a strip around a border between the strip and a flap connected to the strip as a screen to hide the border. Japanese unexamined Patent Publication No. 2008-518135 does not describe: a phenomenon that the sound which penetrates the door glass echoes in a space between the glass and the flap and is amplified; or measures for controlling the phenomenon.

Japanese unexamined Patent Publication No. 2014-159193 discloses to provide a fin at a center of the inner-cabin side wall longer than the outer-cabin side wall, which elastically engages a panel, and to alter structure of the sash for improving appearance by narrowing width of the sash of a panel door. In the same manner as Japanese unexamined Patent Publication No. 2008-518135, Japanese unexamined Patent Publication No. 2014-159193 does not describe: the phenomenon that the sound which penetrates the door glass echoes through the space between the glass and the flap and is amplified; or measures for controlling the phenomenon.

Therefore, an object of the present invention is to provide the glass runs capable of reducing the sound which penetrates the door glasses from the outside of the automobiles.

SUMMARY

In order to achieve the above-mentioned object, according to one aspect of the invention, a glass run (20) of an automobile door (200) is provided, for guiding a door glass (9) in a frame (400), the glass run (20) including: a body (21) having a substantially U-shaped cross-section including an outer-cabin side wall (23), an inner-cabin side wall (22) which is longer than the outer-cabin side wall (23) in cross section and a connecting wall (24) which connects the side walls and forms a channel (27); an outer lip (26) which extends toward an inner-cabin side from an end part (23a) of the outer-cabin side wall (23) and is slidably brought into contact with the door glass (9); an inner lip (25) which extends toward an outer-cabin side from a position on an outer-cabin side surface of the inner-cabin side wall (22) and is slidably brought into contact with the door glass (9), the position being at a distance (41, 42) toward a side of the connecting wall (24) from an end part (22a) of the inner-cabin side wall (22); and a holding lip (28) which extends from the end part (22a) of the inner-cabin side wall (22) for fastening an inner-cabin side part (402) of the frame (400) together with the inner-cabin side wall (22) and elastically engages an inner-cabin side surface of the inner-cabin side part (402) of the frame (400), wherein:

a noise insulation wall (100) protrudes at least on the end part (22a) of the inner-cabin side wall (22) or around the end part (22a) for closing a concave space (51, 52) between an inner-cabin side surface of the door glass (9) and the inner-cabin side wall (22); and the noise insulation wall (100) is integral with or separate from the glass run (20).

It is to be noted that a word "close" here means to slightly block up an exit of the concave space (51, 52) as well as to completely block up the exit.

In addition, according to an aspect of the present invention, a distance (70) between the door glass (9) and the noise insulation wall (100) is not less than 0 mm and not more than 1 mm.

Symbols in parentheses show constituents or items corresponding to the drawings.

According to the present invention, the body of the glass run includes the inner-cabin side wall which is longer than the outer-cabin side wall in cross section and the inner lip at the distance from the end part of the inner-cabin side wall. In addition, the noise insulation wall protrudes at least on the end part of the inner-cabin side wall or around the end part for closing the concave space between the inner-cabin side surface of the door glass and the inner-cabin side wall. Accordingly, the noise insulation wall shades a sound to be emitted inside the automobile, which penetrates the door glass from the outside of the automobile when the door glass is closed, echoes in the concave space and is amplified.

The structure alleviates uncomfortableness to passengers.

Partially providing the noise insulation wall, only on the end part of the inner-cabin side wall or only around the end part for example, accomplishes a sufficient noise insulation effect.

Alternatively, costly though it is, the noise insulation wall may be continuously provided from the end part of the inner-cabin side wall or around the end part over the base root of the inner lip for covering up the concave space, thereby reducing the concave space. In this case, the noise insulation wall reduces the space for the sound, which penetrates the door glass, to enter as well as shades the sound, which echoes in the concave space and is amplified, to be emitted inside the automobile.

According to the structure, it is not preferable that the noise insulation wall touches the inner lip in consideration of a harmful effect on sealing performance of the inner lip but this is not strictly limited.

Variations of the structure include the inner lip arranged to connect with an end part on a side of the connecting wall of the noise insulation wall. In this case, the inner lip extends toward the outer-cabin side from the end part on the side of the connecting wall of the noise insulation wall. Accordingly, when the door glass is in a closed position, the inner lip seals the door glass and when the door glass lifts or lowers, the inner lip is slidably brought into contact with the door glass.

In addition, the distance between the door glass and the noise insulation wall is preferably not less than 0 mm and not more than 1 mm, and most preferably, zero touch which is 0 mm. When the distance is less than 0 mm, in other words when the noise insulation wall makes elastic contact with the door glass, vibration state of the door glass varies depending on a position of the door glass which the noise insulation wall makes elastic contact with. The structure affects sound pressure level of the sound which penetrates the door glass. Specifically, the sound pressure level is amplified in a certain frequency band. Accordingly, the structure is not favorable.

Japanese unexamined Patent Publications No. 2008-518135 and No. 2014-159193 disclose a lip on the end part of the inner-cabin side wall. But the lip makes elastic contact with the door glass, which is not a favorable structure.

When arranging the inner lip to connect with the end part on the side of the connecting wall of the noise insulation wall, the distance between the door glass and the noise insulation wall is preferably within the above-mentioned range for reducing the sound pressure level of the sound which penetrates the door glass. But when a distance is zero touch between the door glass and the base root of the inner lip which extends toward the outer-cabin side from the end part on the side of the connecting wall of the noise insulation wall, the inner lip is subjected to over compression with respect to the door glass. Accordingly, for preventing the over compression, the distance is preferably not less than 1 mm between the door glass and at least a part of the noise insulation wall, which connects with the base root of the inner lip.

DETAILED DESCRIPTION

Figure 1:
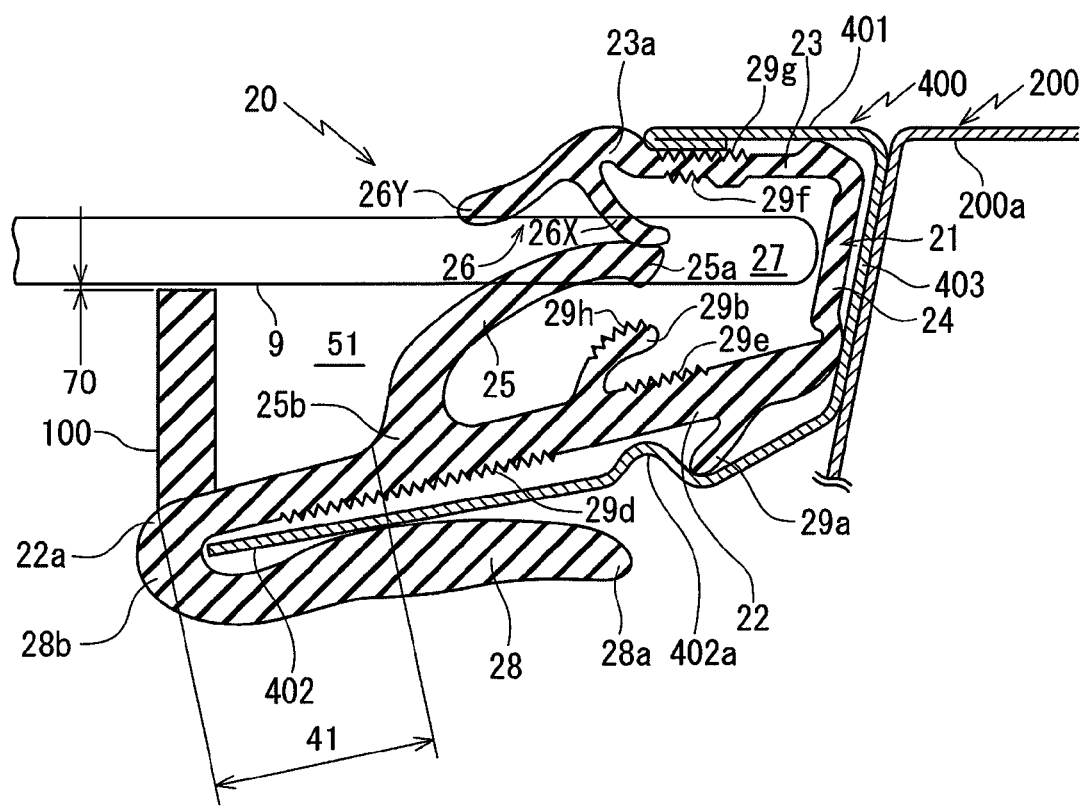
FIG. 1 is an I-I line enlarged cross section of FIG. 12, showing a glass run according to an embodiment of the present invention.
Figure 2:
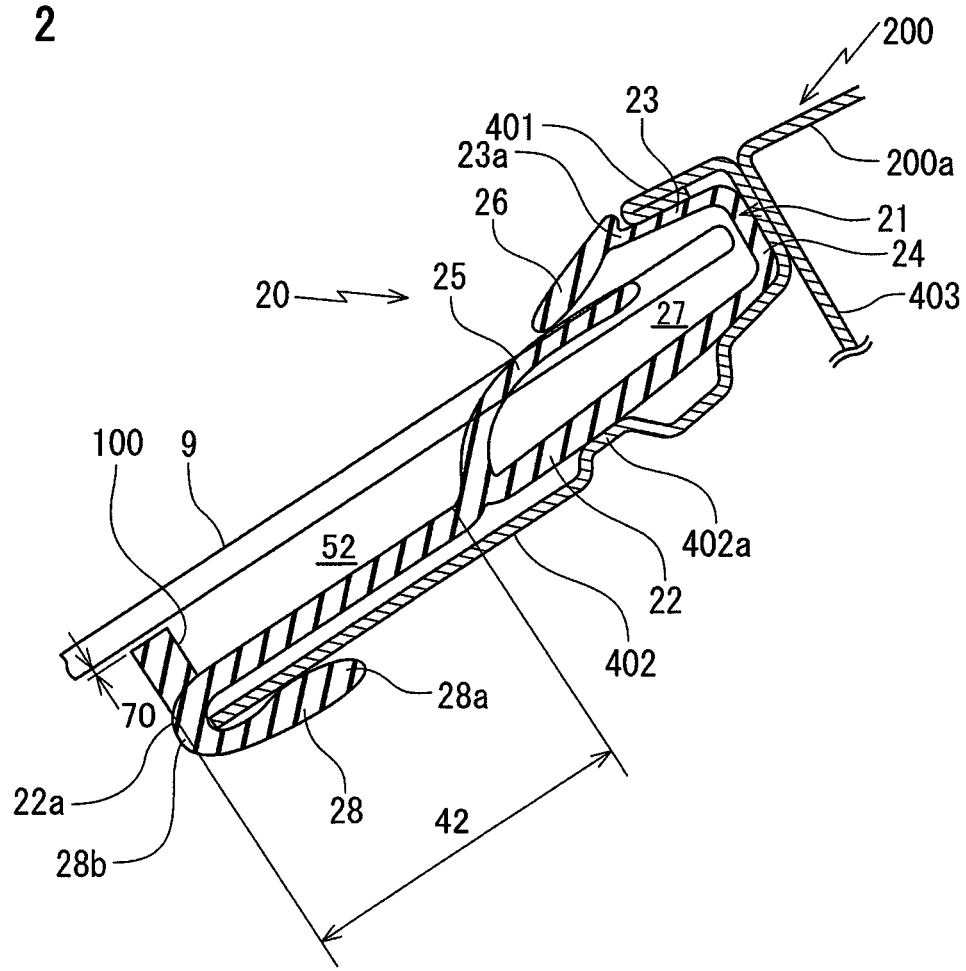
FIG. 2 is a II-II line enlarged cross section of FIG. 12, showing the glass run according to the embodiment of the present invention.
Figure 3:
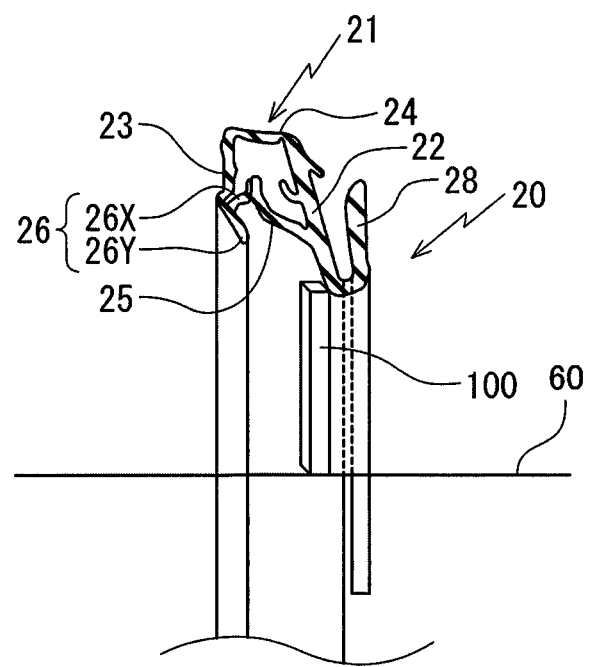
FIG. 3 is a perspective, cross-sectional view of an important part of the glass run according to the embodiment of the present invention.

Referring to FIG. 1 to FIG. 3, a glass run according to an embodiment of the present invention will be described.

FIG. 1 shows a state that a glass run 20 according to the embodiment of the present invention is assembled on a door sash (frame) 400. FIG. 1 corresponds to an I-I line enlarged cross section of FIG. 12 and FIG. 2 corresponds to a II-II line enlarged cross section of FIG. 12. When constituents or items correspond to those in prior arts, the same symbols are used.

The glass run 20 of the present invention is fittable along the door sash (frame) 400 mounted on a door panel 200a of a press door type front door 200 (or a rear door 300 in the same manner) by spot welding. The glass run 20 guides a door glass 9 lifting or lowering into a channel 27.

Figure 12:
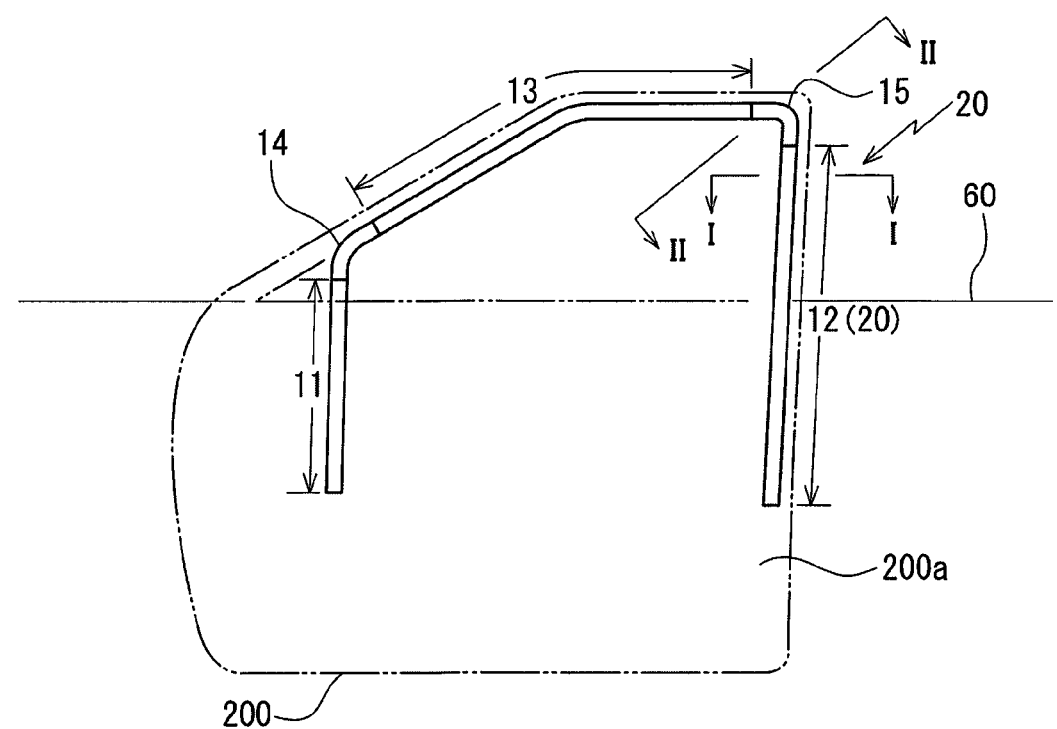
FIG. 12 is a side view of a glass run operatively coupled on a front door of FIG. 11.
Figure 13:
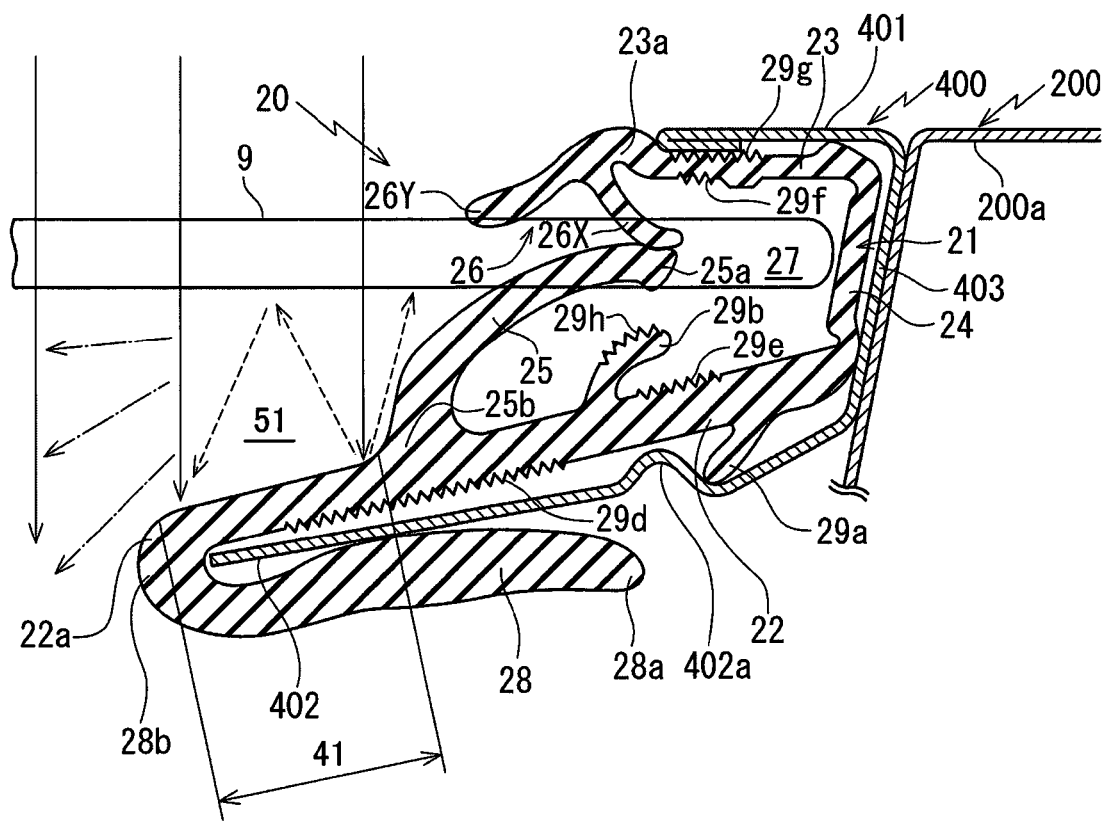
FIG. 13 an I-I line enlarged cross section of FIG. 12, showing a glass run according to a prior art.
Figure 14:
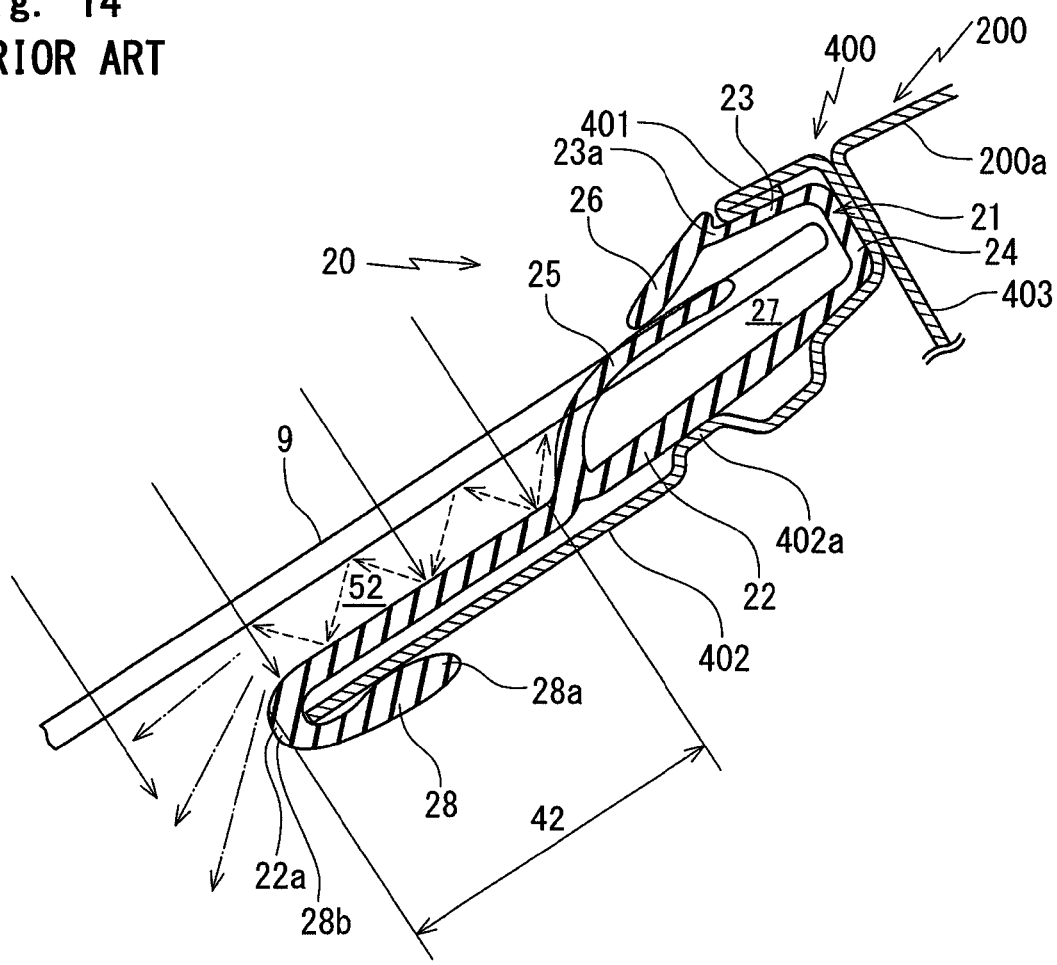
FIG. 14 a II-II line enlarged cross section of FIG. 12, showing the glass run according to the prior art.

The glass run 20 of FIG. 1, as employed in FIG. 12 is applied on a rear side vertical edge part 12 which extends upward from an inner part of the door panel 200a of the front door 200 and is positioned vertically crossing over a position at least on a belt line 60. The glass run 20 is generally formed by extrusion molding. The glass run 20 of FIG. 2, as employed in FIG. 12 is applied on a die molded part 15 between the vertical edge part 12 and a cross edge part 13 and is generally formed by die molding.

As shown in FIG. 1, the door sash 400 has a substantially U-shaped cross section of which inner-cabin side is longer than an outer-cabin side. The door sash 400 includes: an outer-cabin side part 401; an inner-cabin side part 402; and a connecting part 403 which connects the side parts 401 and 402. In the present embodiment, the inner-cabin side part 402 is substantially twice as long as the outer-cabin side part 401 in cross section and is substantially in parallel with the outer-cabin side part 401. The inner-cabin side part 402 has a protrusion 402a which protrudes toward the outer-cabin side.

In accordance with the door sash 400, the glass run 20 includes a body 21 having a substantially U-shaped cross section of which inner-cabin side is longer than an outer-cabin side. The body 21 forms a channel 27 for guiding a door glass 9 lifting or lowering therein. The body 21 includes an inner-cabin side wall 22 and an outer-cabin side wall 23 as the two side walls and a connecting wall 24 which connects the inner-cabin side wall 22 and the outer-cabin side wall 23. In the present embodiment, the inner-cabin side wall 22 is substantially twice as long as the outer-cabin side wall 23 in cross section. The inner-cabin side wall 22 and the outer-cabin side wall 23 of the glass run 20, assembled on the door sash 400 are substantially linear in cross section. The outer-cabin side wall 23 is substantially in parallel with the outer-cabin side part 401. An end part 22a of the inner-cabin side wall 22 inclines toward the inner-cabin side with respect to the inner-cabin side part 402.

An inner lip 25 is formed a position on an outer-cabin side surface of the inner-cabin side wall 22, which is at a distance 41 toward a side of the connecting wall 24 from the end part 22a of the inner-cabin side wall 22. A top end 25a of the inner lip 25 extends toward an outer-cabin side, more specifically toward the side of the connecting wall 24.

A forked outer lip 26 extends toward an inner-cabin side from an inner surface of an end part 23a of the outer-cabin side wall 23, which is an inner-cabin side surface of the end part 23a of the outer-cabin side wall 23. The inner lip 25 and the outer lip 26 are formed in such a manner as to fasten the door glass 9 respectively from the inner-cabin side and the outer-cabin side, and are slidably brought into contact with both surfaces of the door glass 9.

The outer lip 26 is forked into an inner-attaching lip 26X and an outer-attaching lip 26Y. The inner-attaching lip 26X extends toward the inner-cabin side, more specifically toward the side of the connecting wall 24, from the end part 23a of the outer-cabin side wall 23 and faces the inner lip 25. The outer-attaching lip 26Y is substantially perpendicular to a direction in which the inner-attaching lip 26X extends from a base root of the inner-attaching lip 26X, and extends toward an opposite side to the side of the connecting wall 24.

The inner-cabin side wall 22 has lips 29a, 29b formed respectively on an inner-cabin side and an outer-cabin side thereof. The lip 29a extending toward the inner-cabin side from the inner-cabin side wall 22 is anchored by the protrusion 402a formed on an inner-cabin side 402 of the door sash 400. The lip 29b extending toward the outer-cabin side from the inner-cabin side wall 22 abuts an inner-cabin side of the inner lip 25 which bends toward the inner-cabin side wall 22 side when slidably brought into contact with the door glass 9, thereby supporting the inner lip 25.

A holding lip 28 is formed on an inner-cabin surface of the end part 22a of the inner-cabin side wall 22. When the glass run 20 is assembled on the door sash 400, the holding lip 28 extends in a rear direction of the automobile for fastening the inner-cabin side part 402 of the door sash 400 together with the inner-cabin side wall 22, and an outer-cabin side of the holding lip 28 elastically engages an inner-cabin side surface of the inner-cabin side part 402 of the door sash 400. As a result, the door sash 400 holds the glass run 20 assembled thereon. Also, the inner-cabin side and the outer-cabin side of the inner-cabin side wall 22, the inner-cabin side and the outer-cabin side of the outer-cabin side wall 23, and the outer-cabin side of the lip 29b have convexes and concaves 29d, 29e, 29f, 29g and 29h formed thereon for non-slippage.

A noise insulation wall 100 protrudes on a position which is on the end part 22a of the inner-cabin side wall 22 and, as shown in FIG. 3, higher than a belt line 60.

The noise insulation wall 100 is long and narrow in shape (lump shape), which is substantially rectangular in cross section. The noise insulation wall 100 on the outer-cabin side of the end part 22*a* of the inner-cabin side wall 22 protrudes in a substantially perpendicular direction to the surface of the door glass 9. A distance 70 between the door glass 9 and the noise insulation wall 100 is short. The noise insulation wall 100 closes an opening at an exit of a concave space 51 (space among the end part 22*a* of the inner-cabin side wall 22, a base root 25*b* of the inner lip 25, and an inner-cabin side surface of the door glass 9). In the present embodiment, the distance 70 between the door glass 9 and the noise insulation wall 100 is not less than 0 mm and not more than 1 mm so that the noise insulation wall 100 does not make elastic contact with the door glass 9.

Examples of material of the body 21, the inner lip 25, the outer lip 26, the holding lip 28 and the lips 29*a*, 29*b* of the glass run 20 include EPDM rubber, olefinic thermoplastic elastomer and styrene-based thermoplastic elastomer but are not particularly limited. Products may be produced by construction of singular or plural of these materials. Also, the material may be foamed.

Examples of material of the noise insulation wall 100 include various known materials having elasticity such as rubber like materials and porous materials. In the present embodiment, the noise insulation wall 100 is made of solid rubber and is integrally molded with the body 21 of the glass run 20.

In FIG. 1, the noise insulation wall 100 protrudes on a glass run 20 formed by extrusion molding. In the same manner, in FIG. 2, the noise insulation wall 100 protrudes on a glass run 20 formed by die molding, and the noise insulation wall 100 is integral with the glass run 20. In the glass run 20 in FIG. 2, the top end 25*a* of the inner lip 25 extends toward the outer-cabin side, more specifically toward the side of the connecting wall 24, from the position on an outer-cabin side surface of the inner-cabin side wall 22, which is at a distance 42 toward a side of the connecting wall 24 from the end part 22*a* of the inner-cabin side wall 22. The outer lip 26 extends toward the inner-cabin side from the end part 23*a* of the outer-cabin side wall 23. In a different manner from the extrusion molded part (FIG. 1), the outer lip 26 in FIG. 2 is not forked. Shapes of the inner lip 25 and the outer lip 26 are not limited.

As the noise insulation wall 100 protrudes on the end part 22*a* of the inner-cabin side wall 22, the distance at the exit of the concave space 51 (in FIG. 2, concave space 52) between the door glass 9 as closed and the noise insulation wall 100 is shorter. Accordingly, the noise insulation wall 100 shades a sound to be emitted inside the automobile, which penetrates the door glass 9 from the outside of the automobile when the door glass 9 is closed, echoes in the concave space 51 and is amplified.

Also, the noise insulation wall 100 thus added narrows the concave space 51. Accordingly, volume of the sound is decreased, which penetrates the door glass 9, echoes in the concave space 51 (in FIG. 2, concave space 52) and is amplified.

In the present embodiment, the long and narrow noise insulation wall 100, which is substantially rectangular in cross section, protrudes only on the end part 22*a* of the inner-cabin side wall 22. The noise insulation wall 100 may be on a verge of the end part 22*a* of the inner-cabin side wall 22 as well as around the end part 22*a*.

Figure 4:
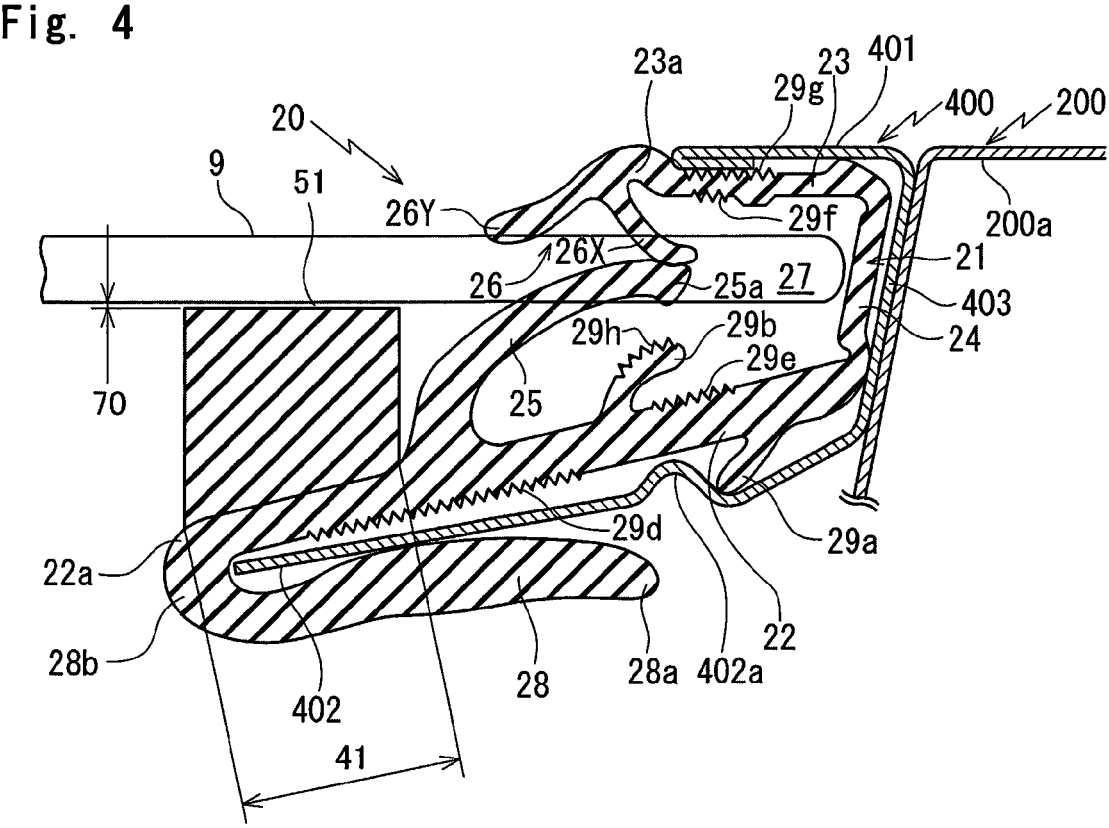
FIG. 4 is an I-I line enlarged cross section of FIG. 12, showing another glass run according to the embodiment of the present invention.
Figure 5:
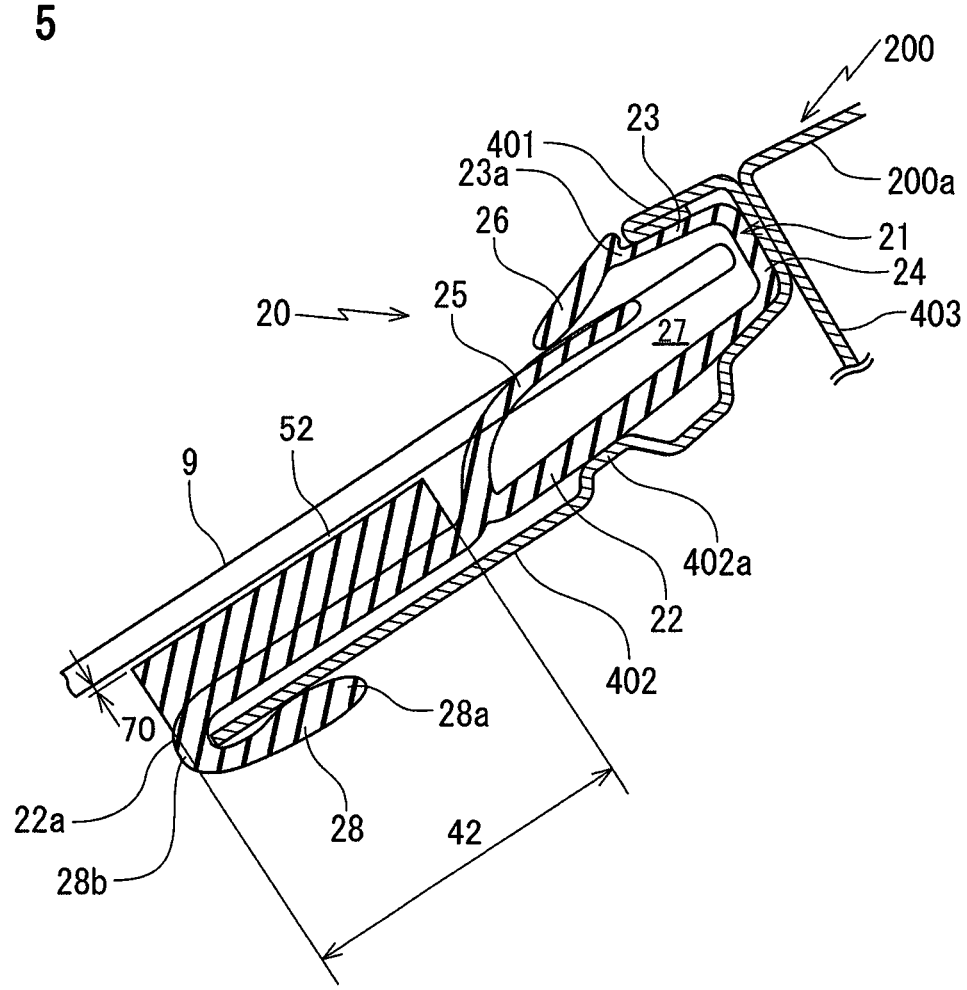
FIG. 5 is a II-II line enlarged cross section of FIG. 12, showing the other glass run according to the embodiment of the present invention.

Alternatively, as shown in FIG. 4 and FIG. 5, the noise insulation wall 100 may be continuously provided from the end part 22*a* of the inner-cabin side wall 22 or around the end part 22*a* over the base root 25*b* of the inner lip 25 for covering up the concave space 51, 52, thereby reducing the concave space 51, 52.

According to the structure, the noise insulation wall 100 covers up the concave space 51, 52 and the space for the sound which penetrates the door glass 9 to echo is reduced.

Figure 15:
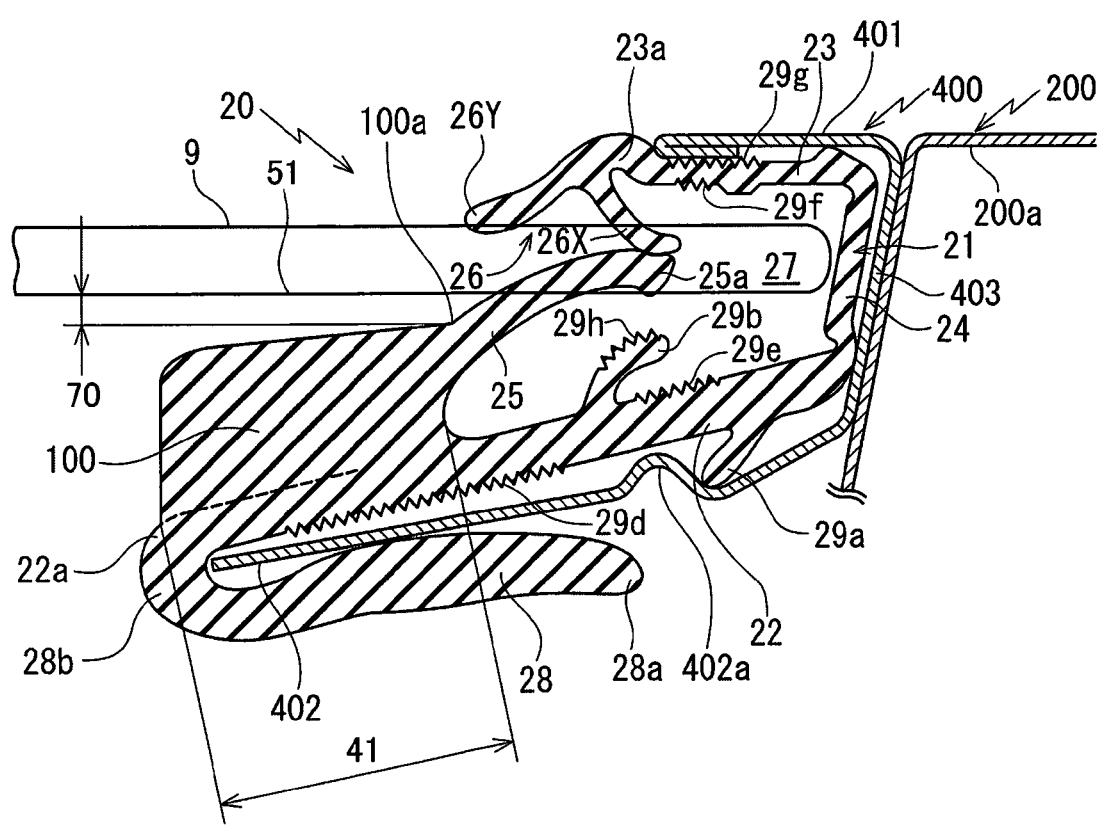
FIG. 15 is an I-I line enlarged cross section of FIG. 12, showing another glass run according to the embodiment of the present invention.
Figure 16:
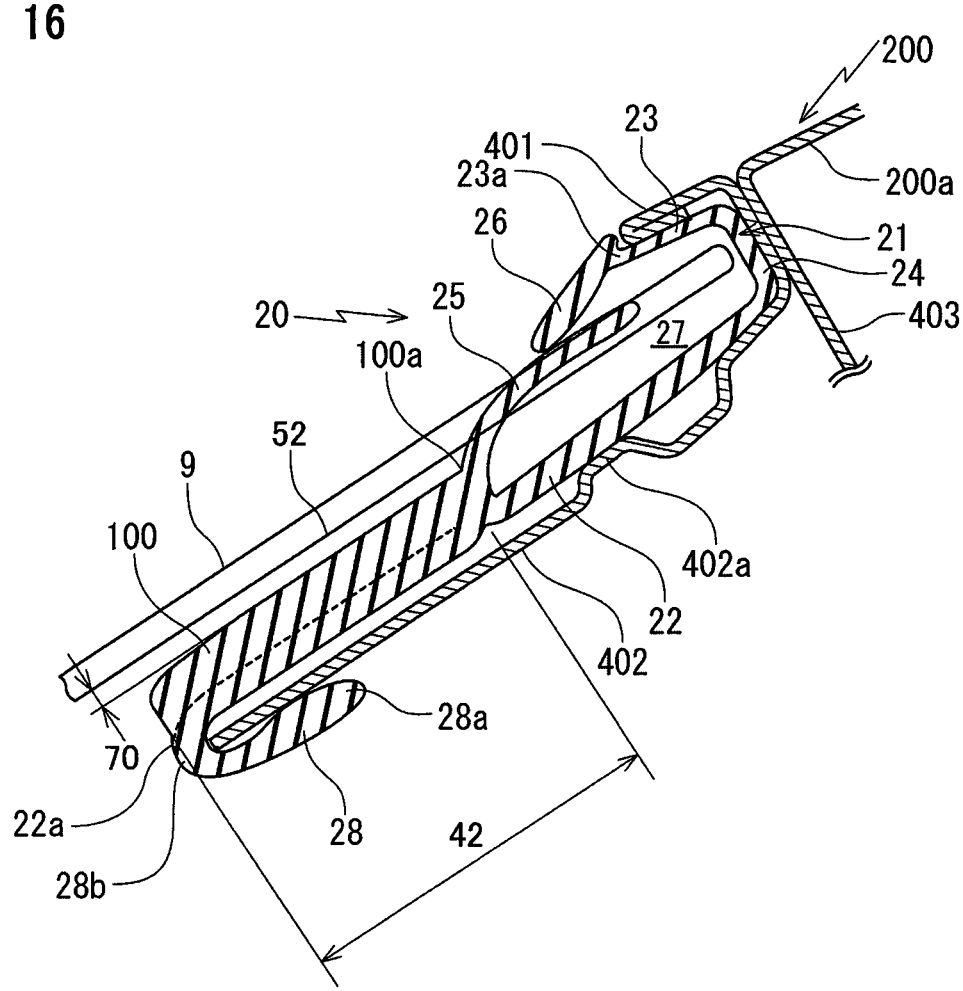
FIG. 16 is a II-II line enlarged cross section of FIG. 12, showing the other glass run according to the embodiment of the present invention.

Alternatively, as shown in FIG. 15 and FIG. 16, the noise insulation wall 100 may be continuously provided from the end part 22*a* of the inner-cabin side wall 22 or around the end part 22*a* over the inner lip 25 for covering up the concave space 51, 52, thereby further reducing the concave space 51, 52. The inner lip 25 extends toward the outer-cabin side from an end part 100*a* on the side of the connecting wall of the noise insulation wall 100. According to the structure, when the door glass 9 is in a closed position, the inner lip 25 seals the door glass 9 and when the door glass lifts or lowers, the inner lip 25 is slidably brought into contact with the door glass 9.

According to the structure, the noise insulation wall 100 covers up the concave space 51, 52 and the space for the sound which penetrates the door glass 9 to echo is further reduced.

Figure 6:
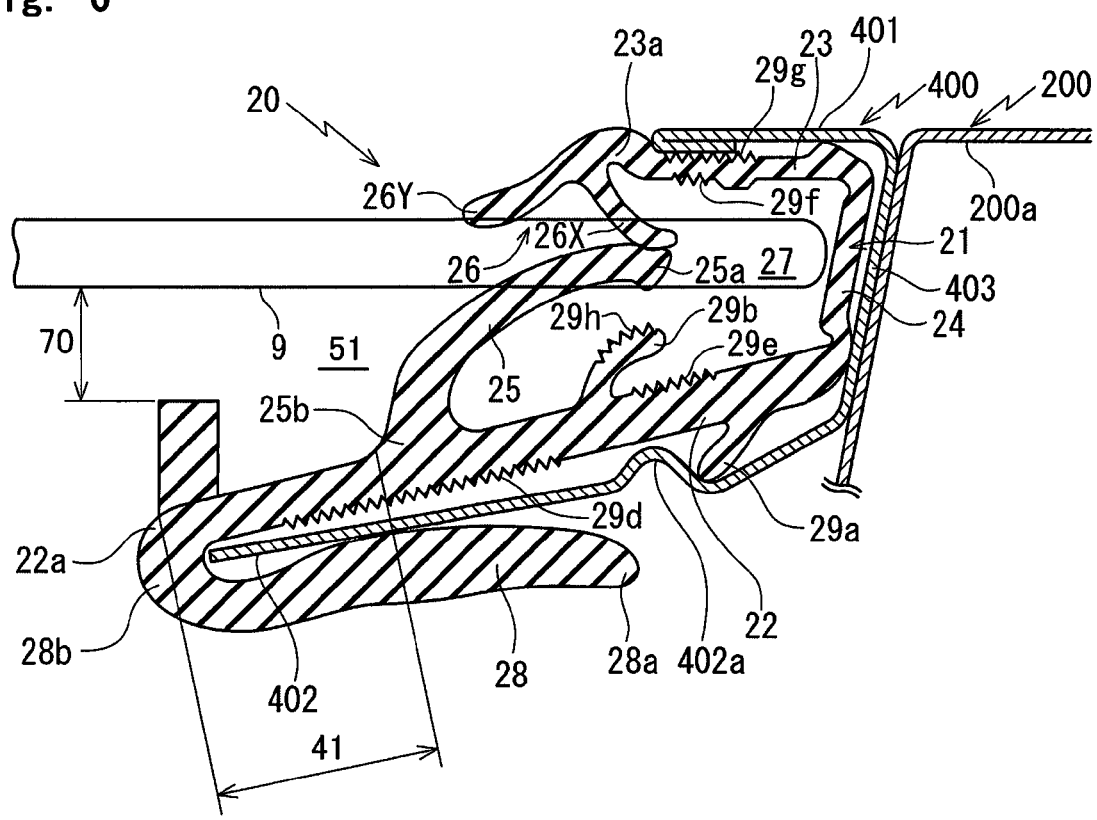
FIG. 6 is an I-I line enlarged cross section of FIG. 12, showing still another glass run according to the embodiment of the present invention.
Figure 7:
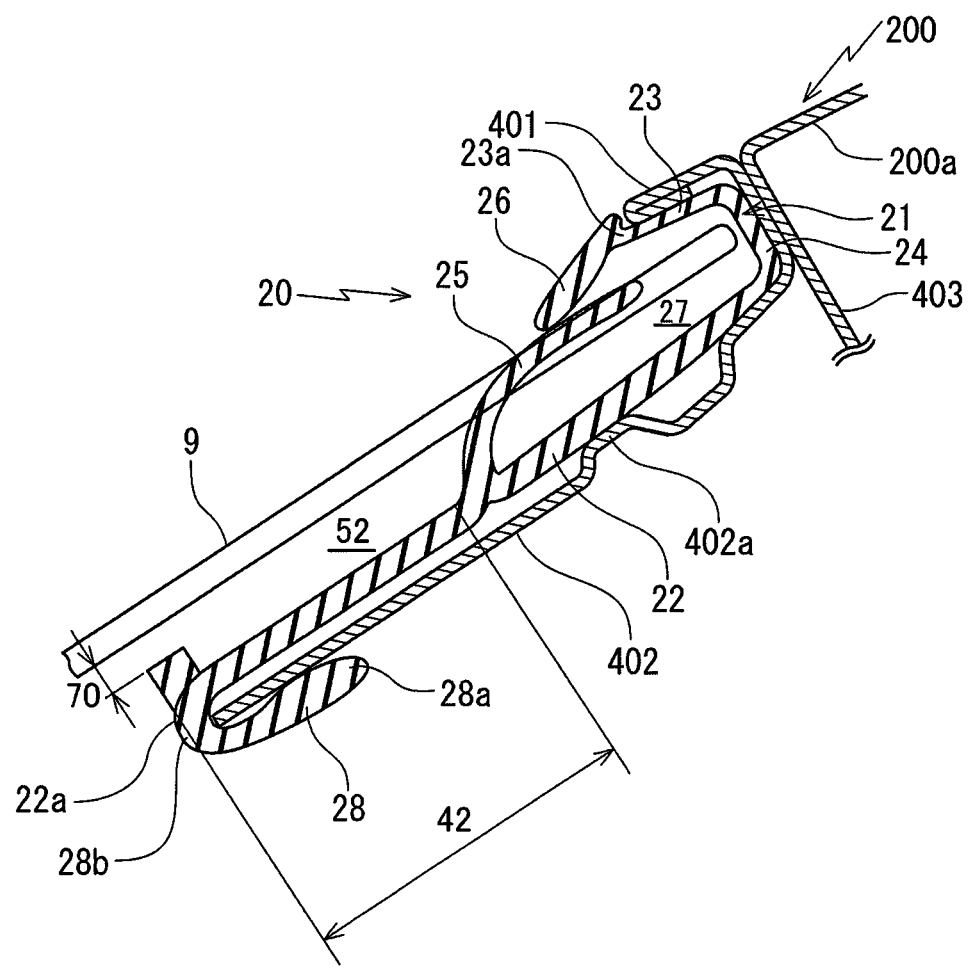
FIG. 7 is a II-II line enlarged cross section of FIG. 12, showing still the other glass run according to the embodiment of the present invention.

In the present embodiment, the distance 70 between the door glass 9 and the noise insulation wall 100 is not less than 0 mm and not more than 1 mm so that the noise insulation wall 100 does not make elastic contact with the door glass 9. But, as shown in FIG. 6 and FIG. 7, the distance 70 may be longer, 6 mm for example. Even in case the distance 70 is longer, the noise insulation wall 100 closes the opening at the exit of the concave space 51, 52 and controls transmission of the sound toward the inner-cabin side.

Figure 8:
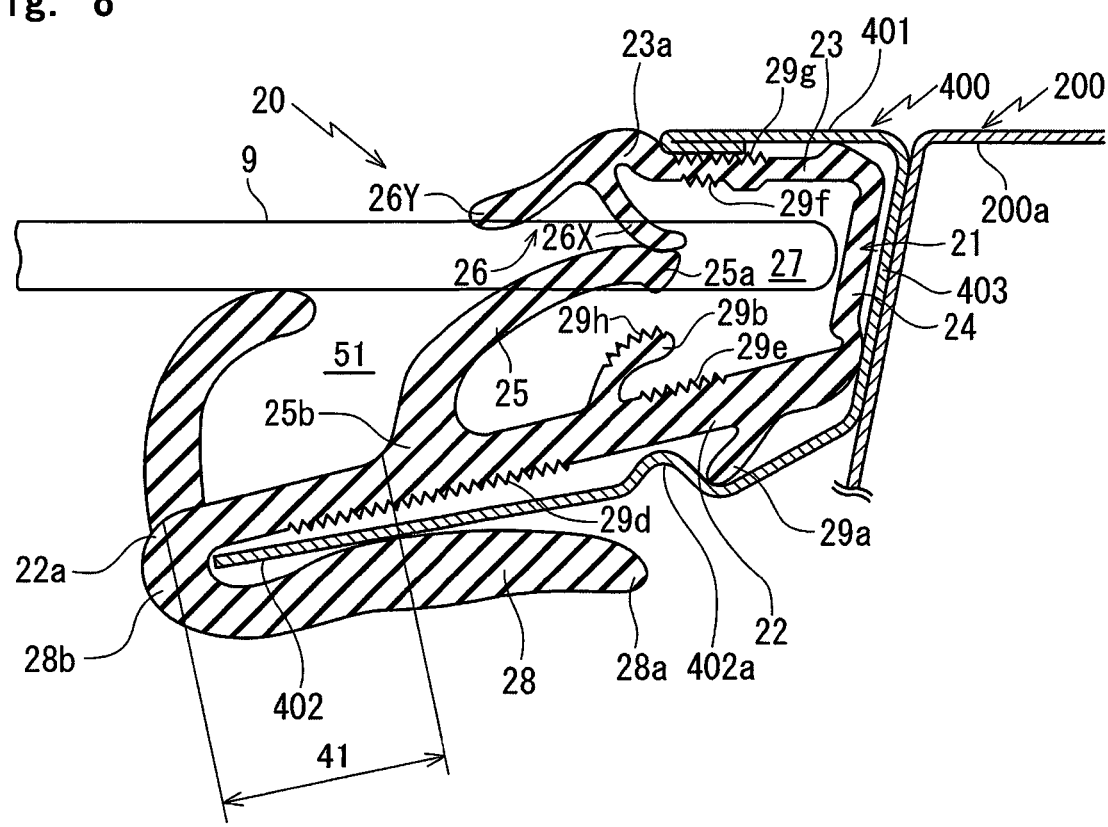
FIG. 8 is an I-I line enlarged cross section of FIG. 12, showing a glass run with double lips for comparison with the glass run according to the embodiment of the present invention.
Figure 9:
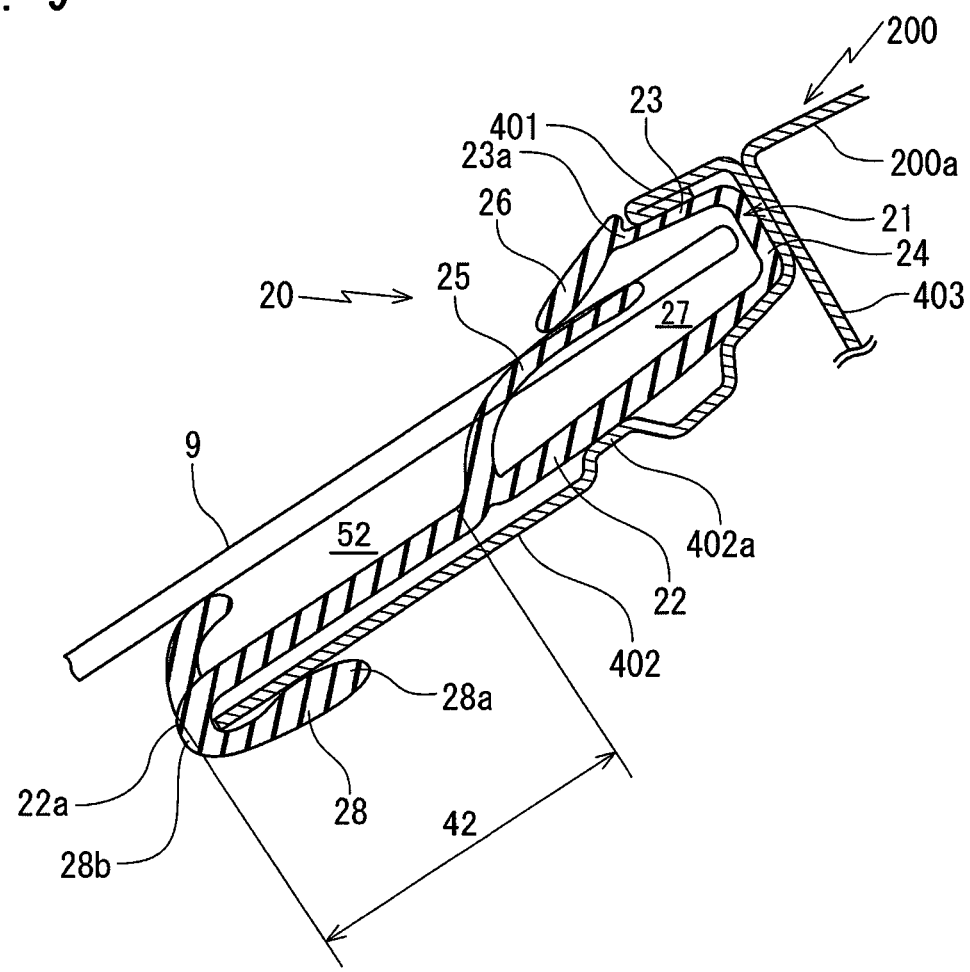
FIG. 9 is a II-II line enlarged cross section of FIG. 12, showing the glass run with the double lips for comparison with the glass run according to the embodiment of the present invention.

Alternatively, as shown in FIG. 8 and FIG. 9, the noise insulation wall 100 may be a seal lip having a tongue shape in cross section. But vibration state of the door glass varies depending on positions of the door glass 9 which the noise insulation wall 100 makes elastic contact with. The structure affects sound pressure level of the sound which penetrates the door glass 9. Specifically, the sound pressure level is amplified in a certain frequency band. Accordingly, the structure is not favorable.

As a result, the distance 70 is most preferably zero touch which is 0 mm between the door glass 9 and the noise insulation wall 100.

When arranging the inner lip 25 to connect with the end part 100*a* on the side of the connecting wall of the noise insulation wall 100, the distance 70 between the door glass 9 and the noise insulation wall 100 is preferably within the above-mentioned range for reducing the sound pressure level of the sound which penetrates the door glass 9. But when the distance 70 is zero touch between the door glass 9 and the base root of the inner lip 25 which extends toward the outer-cabin side from the end part 100*a* on the side of the connecting wall of the noise insulation wall 100, the inner lip 25 is subjected to over compression with respect to the door glass 9. Accordingly, for preventing the over compression, the distance 70 is preferably not less than 1 mm between the door glass 9 and at least a part of the noise insulation wall 100, which connects with the base root of the inner lip 25.

Figure 10A:
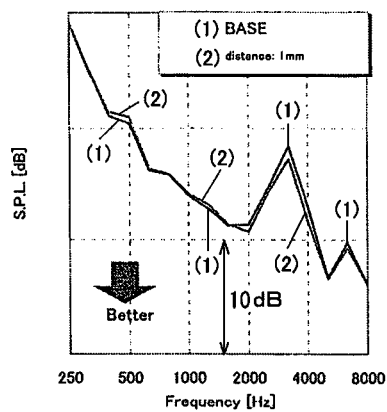
FIGS. 10(a), 10(b) and 10(c) are graphs showing a relation between sound pressure level and frequency on a position of drivers' ears.
Figure 10B:
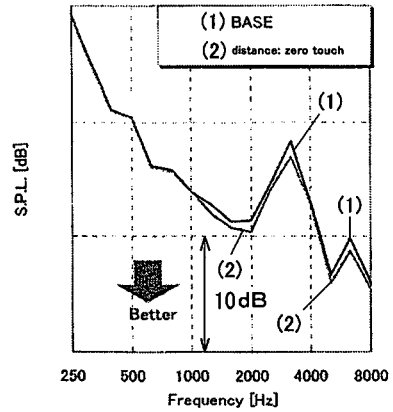
Figure 10C:
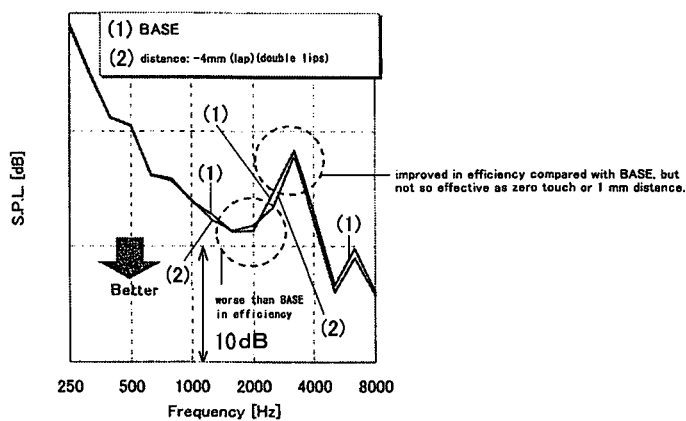
Figure 11:
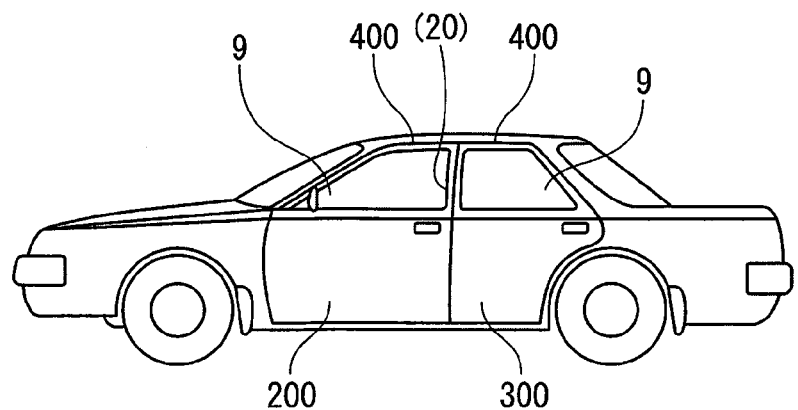
FIG. 11 is a side view of an automobile.

FIG. 10(*a*) to FIG. 10(*c*) show the volume of the sound measured at a position of drivers' ears on a side of the glass. The sound is transmitted toward the inner-cabin side from a speaker (not shown) outside the automobile. FIG. 10(*a*) to FIG. 10(*c*) show a relation between a frequency and sound pressure level in the following cases: the distance 70 is 1 mm between the door glass 9 and the noise insulation wall 100 in FIG. 10(*a*); the distance 70 is zero touch which is 0 mm between the door glass 9 and the noise insulation wall 100 in FIG. 10(b); and the distance 70 is minus (−) 4 mm in FIG. 10(c), in which the noise insulation wall 100 makes elastic contact with the door glass 9 as shown in FIG. 8 and FIG. 9.

Results show that the zero touch is most effective as the distance 70 between the door glass 9 and the noise insulation wall 100 over a wide range of 500 to 8000 Hz, especially around 3150 Hz which is a coincidence frequency of the door glass 9. Also, 1 mm is effective as the distance 70 between the door glass 9 and the noise insulation wall 100 around 3150 Hz. When the distance 70 is minus (−) 4 mm, the sound pressure level increases around 2000 Hz, which means degradation in efficiency.

The results of repeated measurement show that, when the distance 70 is narrower between the door glass 9 and the noise insulation wall 100 at the exit of the concave space 51, 52, the noise insulation wall 100 is more effective in controlling the emission of echo. When the distance 70 is zero touch between the door glass 9 and the noise insulation wall 100, the noise insulation wall 100 is most effective.

As the result of measurement of the sound pressure level in case the distance 70 is 4 to 6 mm between the door glass 9 and the noise insulation wall 100, the sound pressure level reduces and quietness inside the automobile improves in the following order: the noise insulation wall 100 is not provided (BASE); the distance 70 is 4 to 6 mm between the door glass 9 and the noise insulation wall 100; the distance 70 is 1 mm between the door glass 9 and the noise insulation wall 100; and the distance 70 is 0 mm between the door glass 9 and the noise insulation wall 100.

In the present embodiment, the noise insulation wall 100 protrudes within the range on the rear side vertical edge part 12, which is higher than the belt line 60 and lower than a die molded part on a corner part of the front door 200. But the noise insulation wall 100 may be provided only around a position on the rear side vertical edge part 12, which is about the same height as the drivers' ears.

Alternatively, the noise insulation wall 100 may be provided within a range from the position on the rear side vertical edge part 12, which is higher than the belt line 60, to a cross edge part 13 including the die molded part on the corner part of the front door 200.

In the present embodiment, the noise insulation wall 100 is integrally molded with the glass run 20. But a separate noise insulation wall 100 may be adhered on the glass run 20 by adhesive or double sided tape.

We claim:

1. A glass run of an automobile door, for guiding a door glass in a frame, the glass run comprising:
a body having a substantially U-shaped cross-section including an outer-cabin side wall, an inner-cabin side wall which is longer than the outer-cabin side wall in cross section and a connecting wall which connects the side walls and forms a channel; an outer lip which extends toward an inner-cabin side from an end part of said outer-cabin side wall and is slidably brought into contact with said door glass; an inner lip which extends toward an outer-cabin side from a position on an outer-cabin side surface of said inner-cabin side wall and is slidably brought into contact with said door glass, the position being at a distance toward a side of said connecting wall from an end part of said inner-cabin side wall; and a holding lip which extends from the end part of said inner-cabin side wall for fastening an inner-cabin side part of said frame together with said inner-cabin side wall and elastically engages an inner-cabin side surface of the inner-cabin side part of said frame; and
a noise insulation wall protruding from the end part of said inner-cabin side wall for closing a space between an inner-cabin side surface of said door glass and the inner-cabin side wall, and the noise insulation wall integral with or separate from the glass run, a distance between said door glass and said noise insulation wall is greater than 0 mm and less than or equal to 1 mm.

2. The glass run according to claim 1, wherein the noise insulation wall is continuous from the end part of the inner-cabin side wall for closing the space.

3. A glass run of an automobile door, for guiding a door glass in a frame, the glass run comprising:
a body having a substantially U-shaped cross-section including an outer-cabin side wall, an inner-cabin side wall which is longer than the outer-cabin side wall in cross section and a connecting wall which connects the side walls and forms a channel; an outer lip which extends toward an inner-cabin side from an end part of said outer-cabin side wall and is slidably brought into contact with said door glass; an inner lip which extends toward an outer-cabin side from a position on an outer-cabin side surface of said inner-cabin side wall and is slidably brought into contact with said door glass, the position being at a distance toward a side of said connecting wall from an end part of said inner-cabin side wall; and a holding lip which extends from the end part of said inner-cabin side wall for fastening an inner-cabin side part of said frame together with said inner-cabin side wall and elastically engages an inner-cabin side surface of the inner-cabin side part of said frame; and
a noise insulation wall protruding from the end part of said inner-cabin side wall for closing a space between an inner-cabin side surface of said door glass and the inner-cabin side wall, and the noise insulation wall protruding in a direction toward said door glass perpendicular to the inner-cabin side surface of said door glass, a distance between said door glass and said noise insulation wall prevents the noise insulation wall from making contact with the door glass.

4. The glass run according to claim 3, wherein the noise insulation wall is continuous from the end part of the inner-cabin side wall for closing the space.

5. The glass run according to claim 3, wherein the noise insulation wall is integral with the glass run.

6. The glass run according to claim 3, wherein the noise insulation wall is separate from the glass run.

7. The glass run according to claim 3, wherein the distance is less than or equal to 1 mm.

* * * * *